UNITED STATES PATENT OFFICE.

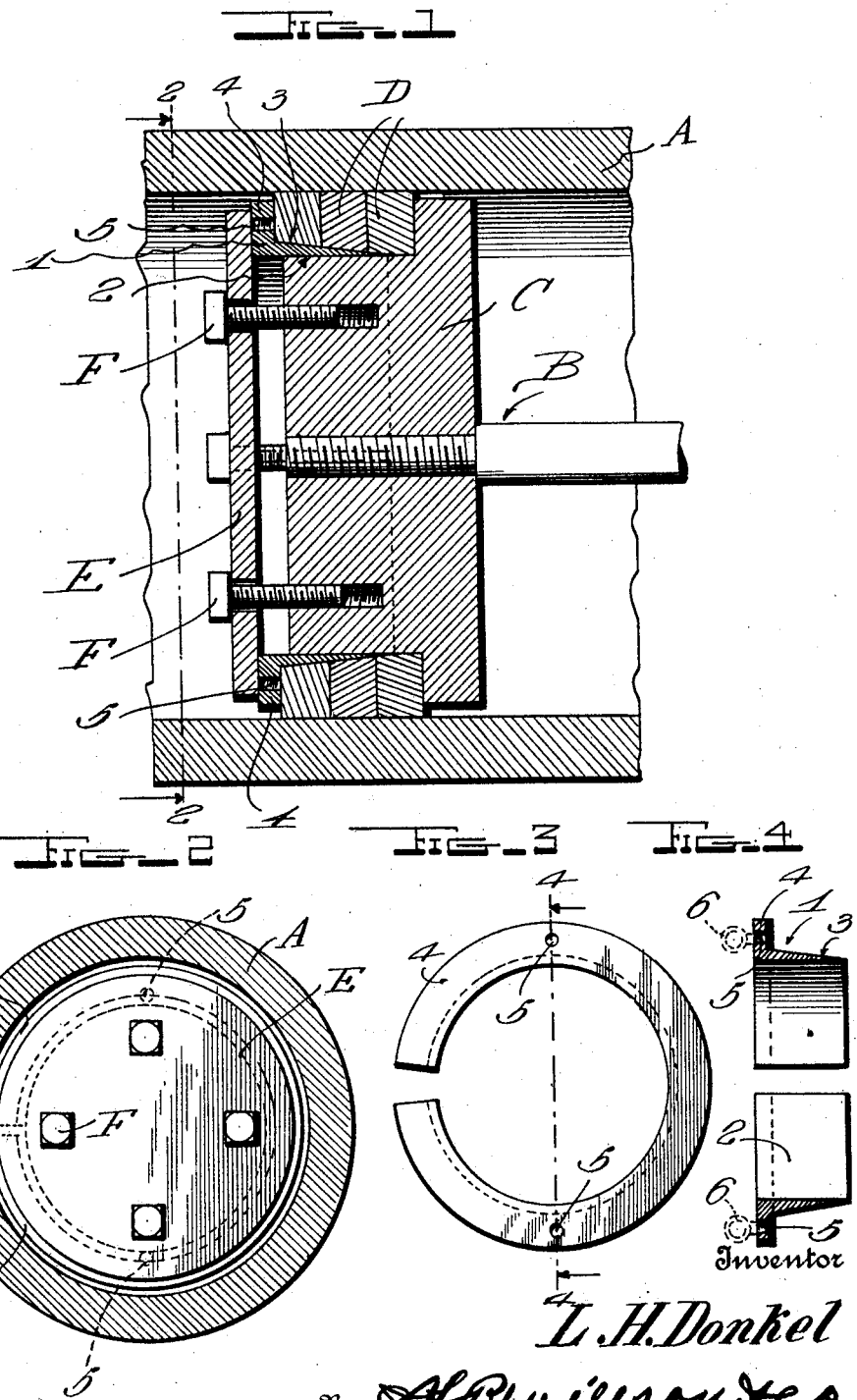

LLOYD H. DONKEL, OF MACON, GEORGIA, ASSIGNOR OF ONE-HALF TO SAMUEL G. PATE, OF MACON, GEORGIA.

COMBINED FOLLOWER AND EXPANDER FOR PACKING-RINGS.

1,392,124.  Specification of Letters Patent.  Patented Sept. 27, 1921.

Application filed January 17, 1921. Serial No. 437,880.

*To all whom it may concern:*

Be it known that I, LLOYD H. DONKEL, a citizen of the United States, residing at Macon, in the county of Bibb and State of Georgia, have invented certain new and useful Improvements in Combined Followers and Expanders for Packing-Rings; and I do declare the following to be a full, clear, and exact description of the invention, such as will enable others skilled in the art to which it appertains to make and use the same.

This invention relates to an improved follower and expander for use in connection with compressible packing rings such as are used in the power reverse cylinders on locomotives, although, it is not to be restricted to this particular use, since it may well serve its purpose when used on other types of pistons provided with packing rings composed of material other than metal.

One object of the invention is to provide a device of this class in the form of a split resilient ring which constitutes a wedge, a follower, and an expander, the ring being normally expanded and when caused to contract, its inherent resiliency causing it to resist such contraction and thus act as the aforesaid expander and assist in compressing the packing and insuring tight contact of the latter with the cylinder wall.

Another and important object of the invention is to provide a device of this class which is such in construction that it may be interposed between the outermost packing ring and usual follower now employed in the power reverse cylinder of a locomotive without requiring any alterations whatsoever of the piston or follower. When the device is in operative position, it takes the place of said follower and the latter serves as an actuator therefor.

A further object of the invention is to provide a device of this class which is of extreme simplicity, possesses great durability and strength, is easy to apply and remove and is very inexpensive to both the manufacturer and the user.

Other objects and advantages of the invention will be apparent during the course of the following description.

In the accompanying drawings forming a part of this specification and in which like numerals are employed to designate like parts throughout the same:

Figure 1 is a central longitudinal sectional view of a conventional type of cylinder and piston embodying a plurality of compressible packing rings and a follower plate, showing my improved device associated therewith.

Fig. 2 is a transverse section taken on the plane of the line 2—2 of Fig. 1, looking the direction of the arrow.

Fig. 3 is a top plan view of a device constructed in accordance with this invention.

Fig. 4 is a section taken therethrough on the line 4—4 of Fig. 3.

In the drawings, the letter A designates a cylinder in which a piston, designated as a whole by the letter B, is slidable. The head C of the piston is formed in its periphery with a relatively deep groove for reception of a plurality of compressible packing rings D, the latter contacting one another in the manner shown. These packing rings are subject to great wear and their life is ordinarily very short. To increase their life and insure against leakage, a follower plate E is employed, this plate being adjustable toward and from the rings through the medium of screws F receivable in screw-threaded sockets formed in the piston head C. Ordinarily, this follower plate bears on the outermost packing ring and when leakage is discovered, the screws F are tightened and the packing rings are in turn compressed because of the pressure of the follower plate on the outermost packing ring. Such compression of the rings forces the latter into tight contact with the cylinder wall and overcomes further leakage. This is the construction and arrangement employed in the power reverse cylinders of locomotives now in use, and while it accomplishes the result fairly well, I find that the life of the rings can be decidedly lengthened by the device to be hereinafter described.

The device above referred to is, in its preferred form, in the form of a split resilient ring 1 made preferably of brass. Since this ring is made from highly resilient material, it will be normally expanded and will be of a diameter greater than that of the part of the piston on which it is fitted. Careful examination of this ring will disclose the fact that the inner face 2 thereof is straight to insure tight and effective contact thereof with the portion of the piston head which it engages. On the other hand, the outer face of the ring is beveled as indicated at 3, and the ring is thus converted into a wedge formed integral with the outer edge of the ring and extending laterally therefrom is a flange 4 which may be well termed here as a follower. If desired, this flange may be formed with two or more screw-threaded holes 5 to permit eye-bolts 6 to be secured therein to permit easy removal of the device from the piston head while it is in the cylinder. It is obvious that by employing a suitable tool, it may be engaged with the eye-bolts and the device can be easily removed. This particular means for removing the ring is not essential and can be varied and any other suitable construction can be used. The only reason for employing it, is to assist the mechanic to easily remove the ring which could not otherwise be done should the ring become stuck.

In use, and assuming that the piston head has been stripped of the old worn ring and follower plate, the new rings are assembled on the wide ring portion of my device and the latter is forced onto the small part of the piston so that it will assume a position approximating that shown in Fig. 1. Then, the follower plate E is placed in position as usual and the screws F are tightened enough to compress the packing rings D just enough to insure a tight contact thereof with the cylinder wall. Now, after the packing rings become worn, they can again be forced into tight contact with the cylinder wall by simply tightening the screws F in the usual way. Such tightening of the screws will force the expander inwardly and such movement of the latter will compress the packing rings and thus accomplish the desired result. It is to be noted, as before stated, that the beveled wall 3 of the device serves as a wedge and contributes partially toward the compression of the packing rings. Also, the lateral flange 4 then becomes the follower instead of the plate E and also contributes to an effective compression of the ring. Furthermore, the inherent resiliency of the expander serves as an additional means for insuring effective compression of the packing rings, this being true because of the natural tendency of the expander to expand radially. At this point, I wish to mention that the radial expansion of the expander is an extremely important point of this invention and because of the wedge action of the device, the radial expansion thereof and follower functions which it embodies, effective compression of the packing rings is insured. Attention is also directed to the fact that as the screws F are tightened more and more, the free ends of the expander will be brought closer together and it will have a greater tendency to expand radially. Such action of the expander assists in greatly insuring an effective compression of the packing rings. In addition to the inclined face 3 of the device serving as a wedge, it also serves to cause the expander to become contracted and thus place it under greater tension and causes a more effective radial expansion of the device.

From the foregoing description, it will be seen that I have devised a device of such construction that it will insure an increased life of compressible packing rings. The radial expansion of the device will cause the packing rings to become radially enlarged and their outer peripheries brought into closer contact with the cylinder wall, and the combined action of the follower flange 4 and wedge surface 3 in conjunction with the radial expansion, will compress the packing rings to such an extent that leakage will be practically impossible. There is practically little or no wear on my device and because of this, it will outlast the piston and cylinder. It will assist in assembling the packing rings on the piston head and will likewise assist in their removal. Its construction is such that it does not necessitate any changes of the piston head on which it is used. These and other features and advantages of the device have, no doubt, become apparent from the foregoing description.

While I have shown and described the device as being used in connection with the piston of a power reverse cylinder for locomotives, I desire it to be understood that it may be equally well used on other types of pistons employing other than metal piston rings. Furthermore, the particular actuator for the device, which is here shown in the form of a follower plate, may be dispensed with and any other suitable device may be substituted for it.

A careful consideration of the foregoing description taken in connection with the accompanying drawings, is thought to be sufficient to enable persons skilled in the art to which the invention relates, to obtain a clear understanding of the same. Therefore, a more lengthy description is deemed unnecessary.

Effective and advantageous results are insured with the construction and arrangement herein shown and described. However, I wish it to be understood that slight minor changes in the shape, size, and arrangement may be resorted to without departing from the spirit of the invention or the scope of the subjoined claims.

What is claimed is:

1. In combination, a piston head, a compressible packing ring arranged thereon, a self-actuated split radially expansible expander disposed between the head and packing ring, and an actuator for moving the expander toward the inner end of the piston, said expander being normally expanded but becoming more and more contracted when moved inwardly by said actuator thus the inherent resiliency of the expander causing it to resist such contraction and permitting it to function as an expander to compress the packing ring.

2. The structure set forth in claim 1, said expander being a relatively wide ring, the inner wall of which is straight and the outer wall of which is beveled, permitting it to serve the additional function of a wedge.

3. A combined follower and packing ring expander comprising a split normally expanded relatively wide ring having a straight and flat inner face to contact a correspondingly shaped portion of a piston head, the outer face of the ring being beveled and functioning in part as a wedge, said ring being provided with a lateral flange at one edge forming a follower.

In testimony whereof I have hereunto set my hand in the presence of two subscribing witnesses.

LLOYD H. DONKEL.

Witnesses:
THOMAS W. TERRY,
E. TURLINGTON.